(12) United States Patent
Fukushima et al.

(10) Patent No.: US 11,276,512 B2
(45) Date of Patent: Mar. 15, 2022

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daichi Fukushima, Mie (JP); Housei Mizuno, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES LTD., Osaka (JP)

( * ) Notice: Subject to any disclaimer, the term of this patent is extended or adjusted under 35 U.S.C. 154(b) by 185 days.

(21) Appl. No.: 16/627,848

(22) PCT Filed: Dec. 13, 2018

(86) PCT No.: PCT/JP2018/045874
§ 371 (c)(1),
(2) Date: Dec. 31, 2019

(87) PCT Pub. No.: WO2020/121480
PCT Pub. Date: Jun. 18, 2020

(65) Prior Publication Data
US 2021/0335521 A1    Oct. 28, 2021

(51) Int. Cl.
*H01B 7/40*    (2006.01)
*H02G 3/30*    (2006.01)

(52) U.S. Cl.
CPC ..................................... *H01B 7/40* (2013.01)

(58) Field of Classification Search
CPC ... B60R 16/0215; B60R 16/0207; H01B 7/40; H01B 7/0846; H01B 7/0045
See application file for complete search history.

(56) References Cited

U.S. PATENT DOCUMENTS 2,701,819 A * 2/1955 Hirtle .................. H02G 3/266
174/117 A
4,678,864 A * 7/1987 Cox ..................... H01B 7/0823
156/289

(Continued)

FOREIGN PATENT DOCUMENTS

CN    104466800    3/2015
FR    2 415 349    8/1979

(Continued)

OTHER PUBLICATIONS

Indian Office Action issued in Indian Application No. 201917053957, dated Jul. 22, 2021.

(Continued)

*Primary Examiner* — Hoa C Nguyen
*Assistant Examiner* — Amol H Patel
(74) *Attorney, Agent, or Firm* — Greenblum & Bernstein, P.L.C.

(57) ABSTRACT

A wiring member includes a wire-like transmission member and a sheet member. The wire-like transmission member includes a transmission line main body and a covering that covers the transmission line main body. The sheet member includes a wire holding portion that is directly fixed to the covering of the wire-like transmission member disposed on a main surface and holds the wire-like transmission member, and a covering breakage suppressing portion that is provided around the wire holding portion and is broken before breakage of the covering and peeling between the wire holding portion and the covering when a force for peeling is applied to the wire-like transmission member.

7 Claims, 5 Drawing Sheets

(56) References Cited

U.S. PATENT DOCUMENTS

| | | | | | |
|---|---|---|---|---|---|
| 5,276,759 | A | * | 1/1994 | Nguyen | H01B 7/0846 156/55 |
| 5,327,513 | A | * | 7/1994 | Nguyen | G02B 6/4403 156/55 |
| 2012/0292076 | A1 | * | 11/2012 | Shoemaker | H01B 11/1895 174/107 |

FOREIGN PATENT DOCUMENTS

| | | |
|---|---|---|
| JP | 58-192408 U | 12/1983 |
| JP | 2005-179420 A | 7/2005 |
| JP | 2013-127866 A | 6/2013 |
| JP | 5848968 | 1/2016 |
| JP | 2018-196174 A | 12/2018 |

OTHER PUBLICATIONS

Official Communication issued in International Bureau of WIPO Patent Application No. PCT/JP2018/045874, dated Feb. 26, 2019.
China Official Action received in CN Application No. 201880045709.X dated Apr. 27, 2021, and English language translation thereof.

* cited by examiner

WIRING MEMBER

TECHNICAL FIELD

The present invention relates to a wiring member.

BACKGROUND ART

Patent Document 1 discloses a technique for manufacturing a wire harness by fixing a covered electrical wire and a reinforcing material to a belt-shaped body made from soft synthetic resin by heat-pressurizing welding.

PRIOR ART DOCUMENT

Patent Document

Patent Document 1: Japanese Unexamined Utility Model Application Publication No. 58-192408 (1983)

SUMMARY

Problem to be Solved by the Invention

In the wire harness in which the belt-shaped body and the covered electrical wire are welded as in Patent Document 1, the belt-shaped body and the covered electrical wire may be firmly welded. In such a case, for example, when a force in the direction of peeling from the belt-shaped body is applied to the covered electrical wire, the covering 94 of the covered electrical wire 92 may be broken instead of the belt-shaped body 90 and the covered electrical wire 92 peeling off each other, as shown in FIG. 8. If the covering 94 of the covered electrical wire 92 breaks, the core wire 96 of the covered electrical wire 92 may be exposed, and a short circuit or the like may occur.

In view of the above, an object of the present invention is to provide a technique of suppressing breakage of a covering of a wire-like transmission member when a force of peeling from a sheet member is applied to the wire-like transmission member in a wiring member in which the sheet member and the covering of the wire-like transmission member are directly fixed.

Means to Solve the Problem

In order to solve the above problem, a wiring member according to a first aspect includes a wire-like transmission member including a transmission line main body and a covering that covers the transmission line main body, and a sheet member including a wire holding portion that is directly fixed to the covering of the wire-like transmission member disposed on a main surface and holds the wire-like transmission member, and a covering breakage suppressing portion that is provided around the wire holding portion and is broken before breakage of the covering and peeling between the wire holding portion and the covering when a force for peeling is applied to the wire-like transmission member.

The wiring member according to a second aspect is the wiring member according to the first aspect, in which the covering breakage suppressing portion is formed such that the sheet member is broken in a manner of separating in a thickness direction.

The wiring member according to a third aspect is the wiring member according to the first or second aspect, in which the covering breakage suppressing portion is formed such that a side portion of the wire-like transmission member in the sheet member is broken in a manner of separating in an in-plane direction.

The wiring member according to a fourth aspect is the wiring member according to the third aspect, in which an intermittent fracture portion where the sheet member is intermittently broken is formed in the side portion of the wire-like transmission member in the sheet member along a longitudinal direction of the wire-like transmission member.

The wiring member according to a fifth aspect is the wiring member according to the fourth aspect, in which the intermittent fracture portion is formed with a depth from a main surface on a side of the wire-like transmission member to a middle portion in the thickness direction in the sheet member.

The wiring member according to a sixth aspect is the wiring member according to any one of the first to fifth aspects, in which the sheet member includes a layer formed of nonwoven fabric, and the covering breakage suppressing portion is formed to be broken by peeling inside the nonwoven fabric.

The wiring member according to a seventh aspect is the wiring member according to the sixth aspect, in which the sheet member further includes a layer laminated on the layer formed of the nonwoven fabric and directly fixed to the wire-like transmission member.

The wiring member according to an eighth aspect is the wiring member according to any one of the first to seventh aspects, in which the covering breakage suppressing portion is provided at an end portion of the sheet member.

Effects of the Invention

According to each aspect, since the covering breakage suppressing portion breaks before breakage of the covering and peeling between the wire holding portion and the covering, breakage of the covering can be suppressed.

According to the second aspect, part of the sheet member can be kept continuous in the in-plane direction.

According to the third aspect, in a case of being formed so as to be separated in the thickness direction, the side portion of the wire-like transmission member in the sheet member is formed so as to be broken in a manner of separating in the in-plane direction, so that the range of separation in the thickness direction can be reduced. Further, in a case of being formed so as not to be separated in the thickness direction, the side portion of the wire-like transmission member in the sheet member is formed so as to be broken in a manner of separating in the in-plane direction, so that reduction in the thickness of the wire holding portion can be suppressed.

According to the fourth aspect, the side portion of the wire-like transmission member in the sheet member is likely to be broken by the intermittent fracture portion.

According to the fifth aspect, the sheet member can be broken also in the thickness direction.

According to the sixth aspect, the covering breakage suppressing portion can be easily formed from the nonwoven fabric.

According to the seventh aspect, a layer of the nonwoven fabric can be provided as a layer different from the layer directly fixed to the wire-like transmission member.

The force for peeling the wire-like transmission member is likely to be applied to the end portion of the sheet member. Even in this case, according to the eighth aspect, since the covering breakage suppressing portion is provided at the end portion of the sheet member, breakage of the covering can be suppressed at the end portion of the sheet member.

DESCRIPTION OF EMBODIMENT

Embodiment

Figure 1:
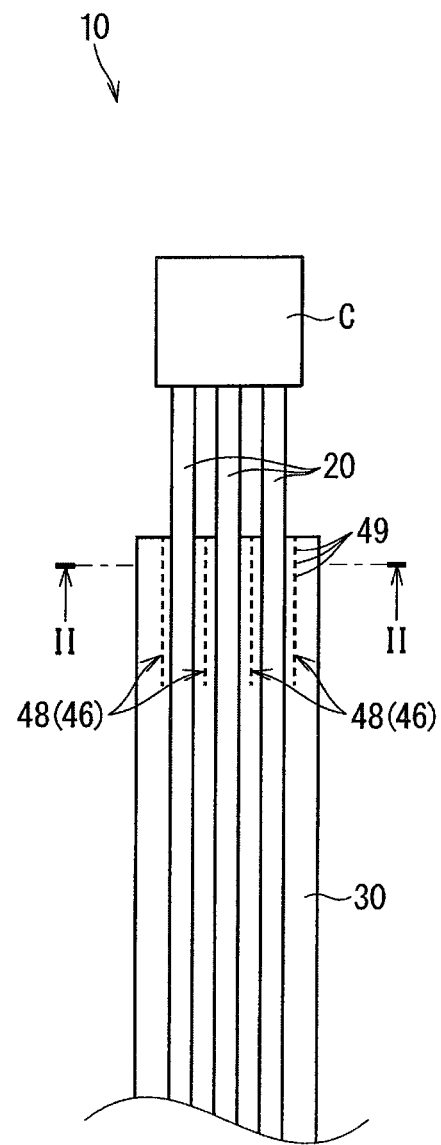
FIG. 1 is a plan view showing a wiring member according to an embodiment.
Figure 2:
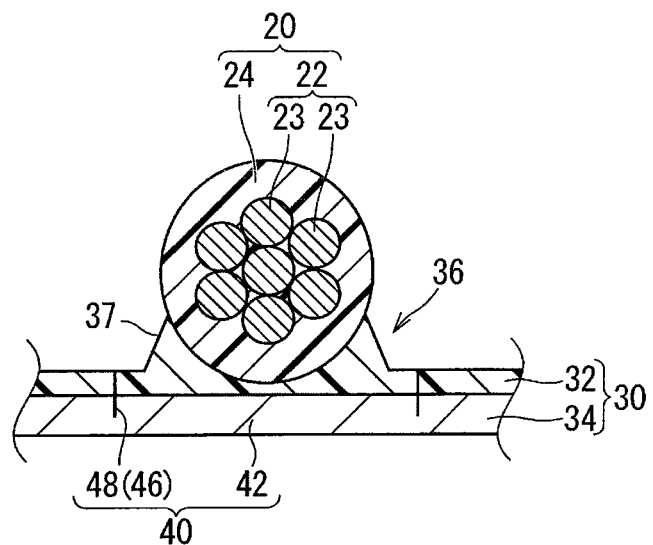
FIG. 2 is a cross-sectional view taken along line II-II in FIG. 1.

Hereinafter, a wiring member according to an embodiment will be described. FIG. 1 is a plan view showing a wiring member 10 according to the embodiment. FIG. 2 is a cross-sectional view taken along line II-II in FIG. 1.

The wiring member 10 is a member that is disposed in a vehicle or the like and transmits and receives electric power, signals, and the like to and from equipment mounted on the vehicle. The wiring member 10 includes a wire-like transmission member 20 and a sheet member 30.

The wire-like transmission member 20 is preferably a wire-like member that transmits electricity, light, or the like. The wire-like transmission member 20 includes a transmission line main body 22 that transmits electricity, light, or the like, and a covering 24 that covers the transmission line main body 22. For example, the wire-like transmission member 20 may be a general electrical wire having a core wire 22 and the covering 24 around the core wire 22, or may be a shielded wire, a twisted wire, an enameled wire, a nichrome wire, an optical fiber, or the like. Hereinafter, an example in which the wire-like transmission member 20 is a general electrical wire will be described. In the example shown in FIG. 2, the core wire 22 in which a plurality of strands 23 are twisted is employed as the transmission line main body 22. Of course, the core wire 22 may be a single strand. The covering 24 is formed by, for example, extrusion-molding a resin material around the core wire 22.

As the wire-like transmission member 20 for transmitting electricity, various signal lines and various power lines may be used. The wire-like transmission member 20 that transmits electricity may be used as an antenna, a coil, or the like that sends or receives a signal or power to or from space.

Further, the wire-like transmission member 20 may be a single wire-like object, or a composite of a plurality of wire-like objects (a twisted wire, a cable in which a plurality of wire-like objects are assembled and covered with a sheath, or the like).

A terminal, a connector C, and the like are appropriately provided at an end portion of the wire-like transmission member 20 according to a connection form between the wire-like transmission member 20 and a mating member.

The wire-like transmission member 20 is disposed on one main surface of the sheet member 30. The sheet member 30 holds a plurality of the wire-like transmission members 20 in an aligned state. The sheet member 30 is formed in a belt shape extending along a path of the wire-like transmission member 20. In the example shown in FIG. 1, the sheet member 30 is formed to extend linearly.

Note that, in the example illustrated in FIG. 1, the wire-like transmission member 20 is linearly disposed on the sheet member 30. The path of the wire-like transmission member 20 on the sheet member 30 is preferably set as appropriate, and may be bent and disposed on the sheet member 30, or both a portion where the path is disposed linearly and a portion where the path is bent and disposed may exist. In a case where there is a portion where the wire-like transmission member 20 is bent and disposed on the sheet member 30, the sheet member 30 may also be bent.

Further, in the example shown in FIG. 1, the plurality of wire-like transmission members 20 are arranged so as to extend in parallel. However, each path of the plurality of wire-like transmission members 20 may be set as appropriate, and may be different from each other so as to branch or intersect on the sheet member 30. In this case, the sheet member 30 may also be formed to branch or intersect.

Further, in the example shown in FIG. 1, the plurality of the same wire-like transmission members 20 are disposed on one of the sheet member 30. However, the diameter, use, structure, and the like of the plurality of wire-like transmission members 20 are preferably set as appropriate, and the wire-like transmission members 20 having different diameters, uses, structures, and the like may be disposed on the same sheet member 30.

The wire-like transmission member 20 and the sheet member 30 are directly fixed. Here, "directly fixed" means that a contact portion is directly attached and fixed by, for example, melting resin contained in at least one of the wire-like transmission member 20 and the sheet member 30.

In the formation of the directly fixed state, for example, the resin can be considered to be melted by heat, or dissolved by a solvent. That is, the directly fixed state may be a directly fixed state by heat or a directly fixed state by a solvent. Preferably, the directly fixed state by heat is employed.

At this time, the means for forming the directly fixed state is not particularly limited, and various means including publicly-known means, such as melting and joining, fusion, and welding, can be used. For example, in a case where the directly fixed state by heat is formed by welding, various welding means, such as ultrasonic welding, heat-pressurizing welding, hot air welding, and high frequency welding, can be employed. Further, when the directly fixed state is formed by the means, the wire-like transmission member 20 and the sheet member 30 are in the directly fixed state by the means. Specifically, for example, when the directly fixed state is formed by ultrasonic welding, the wire-like transmission member 20 and the sheet member 30 are in the directly fixed state by ultrasonic welding. A portion where the directly fixed state by heat is formed by welding (the fixed portion between the wire-like transmission member 20 and the sheet member 30) may be referred to as a welded portion, and, of such portions, a fixed portion by ultrasonic welding may be referred to as an ultrasonic welded portion, a portion by heat-pressurizing welding may be referred to as a heat-pressurizing welded portion.

In the case of direct fixing, only the resin contained in the covering 24 of the wire-like transmission member 20 may be melted, or only the resin contained in the sheet member 30 may be melted. Further, in the case of direct fixing, both the resin contained in the covering 24 of the wire-like transmission member 20 and the resin contained in the sheet member 30 may be melted.

Note that the range in which the wire-like transmission member 20 and the sheet member 30 are directly fixed along the longitudinal direction of the wire-like transmission member 20 is not particularly limited. For example, the wire-like transmission member 20 and the sheet member 30 may be directly fixed continuously along the longitudinal direction of the wire-like transmission member 20, or may be directly fixed intermittently.

The sheet member 30 may be the sheet member 30 having rigidity that is sufficient for the plurality of wire-like transmission members 20 to be held in a state of being positioned planarly while being curved, or may be the sheet member 30 having rigidity that is sufficient for the plurality of wire-like transmission members 20 to be held in a two-dimensionally positioned state while being maintained in a flat state. The sheet member 30 may have a three-dimensionally shaped portion, in such a manner that a wall is provided to stand partially.

The material constituting the sheet member 30 is not particularly limited. However, the sheet member 30 is formed of a material containing resin, such as polyvinyl chloride (PVC), polyethylene terephthalate (PET), polypropylene (PP), or the like. The sheet member 30 may be a sheet material in which the inside is uniformly filled, or may be fabric, such as nonwoven fabric, woven fabric, or knitted fabric. The sheet member 30 may include a material, such as metal.

The sheet member 30 may be a single layer or a plurality of laminated layers. In a case where a plurality of layers are laminated, for example, lamination of a resin layer and a resin layer is conceivable. Further, for example, lamination of a resin layer and a metal layer is conceivable.

Here, the sheet member 30 includes a first layer 32 and a second layer 34. The first layer 32 and the second layer 34 are laminated on each other so as to overlap in the thickness direction. The first layer 32 is exposed as one main surface of the sheet member 30. The wire-like transmission member 20 is disposed on the first layer 32. The first layer 32 is directly fixed to the covering 24.

For example, the first layer 32 is formed of a material that is easier to be directly fixed to the covering 24 than the second layer 34, and the second layer 34 is formed of a material that has a function different from the first layer 32 or a high function in terms of protective performance, soundproof performance, and the like. As the sheet member 30, the sheet member 30, in which, for example, the first layer 32 is formed in a sheet shape in which the inside is uniformly filled using, as a material, the same resin as the covering 24 of the wire-like transmission member 20, and the second layer 34 is formed of nonwoven fabric using, as a material, resin different from that of the covering 24 of the wire-like transmission member 20 can be employed. In the sheet member 30, for example, the melted resin material of the first layer 32 enters between fibers of the second layer 34 and solidifies, so that the first layer 32 and the second layer 34 are fixed in a laminated state.

The sheet member 30 is provided with a wire holding portion 36 and a covering breakage suppressing portion 40.

The wire holding portion 36 is a portion that holds the wire-like transmission member 20 by being directly fixed to the covering 24 of the wire-like transmission member 20 disposed on the main surface. As described above, here, the wire-like transmission member 20 is disposed on and directly fixed to the main surface of the first layer 32. For this reason, here, the portion of the first layer 32 where the wire-like transmission member 20 is disposed and directly fixed is the wire holding portion 36. At this time, the wire holding portion 36 is formed of a material that is compatible with the covering 24, and has a portion 37 formed by part of the wire holding portion 36 rises on the main surface, so that the wire holding portion 36 can contact the periphery of the covering 24 as much as possible. The raised portion 37 is formed in a manner that, for example, at the time of direct fixing, a portion of the first layer 32 away from the wire-like transmission member in the side portion of the wire-like transmission member is pressed and brought closer to the wire-like transmission member side. By the formation of the raised portion 37, the fixing strength including the peeling strength is improved between the wire holding portion 36 and the covering 24, and the wire holding portion 36 and the covering 24 are less easily peeled off.

The covering breakage suppressing portion 40 is provided around the wire holding portion 36. The covering breakage suppressing portion 40 is a portion that is to be broken before the breakage of the covering 24 and the peeling of the wire holding portion 36 and the covering 24 when a peeling force is applied to the wire-like transmission member 20. Here, a thickness direction separation promoting portion 42 is formed as the covering breakage suppressing portion 40. Further, here, an in-plane direction separation promoting portion 46 is also formed as the covering breakage suppressing portion 40.

The thickness direction separation promoting portion 42 is formed to be broken in a manner that the sheet member 30 is separated in the thickness direction before the breakage of the covering 24 and the peeling of the wire holding portion 36 and the covering 24 when the peeling force is applied to the wire-like transmission member 20. Here, the nonwoven fabric constituting the second layer 34 functions as the thickness direction separation promoting portion 42. That is, the sheet member 30 is formed so as to be broken in such a manner that the sheet member 30 is separated in the thickness direction by peeling inside the nonwoven fabric constituting the second layer 34. Here, the nonwoven fabric is formed by joining of fibers intertwined with or bonded to each other. Peeling inside the nonwoven fabric means that the nonwoven fabric is separated by intensive unraveling or tearing of fibers in part of the nonwoven fabric.

The nonwoven fabric is formed, for example, as described below. That is, first, a web in which short fibers or long fibers are gathered into a sheet shape is formed by various methods, such as a dry method or a spunbond method. Then, the fibers between a plurality of laminated webs are joined by various methods, such as thermal bonding or needle punching, and become the nonwoven fabric. At this time, for example, by reducing the number of fibers constituting the web or by weakening the bonding strength between the webs, the bonding strength between the fibers can be weakened, and peeling inside the nonwoven fabric is easily caused before breakage of the covering 24.

In the inside of the nonwoven fabric, a part may be formed so as to be more easily peeled than the other parts, or the nonwoven fabric may be formed such that peeling inside the nonwoven fabric is uniform. In the former case, a peeling position can be easily adjusted. In the latter case, an optional portion is peeled off as appropriate depending on the degree of stress applied.

Note that the thickness direction separation promoting portion 42 may be formed so as to be separated in the first layer 32, or formed so as to be separated between the first layer 32 and the second layer 34. These examples will be described later in detail. Separation of the sheet member 30 at any position in the thickness direction including not only separation between the first layer 32 and the second layer 34, but also separation in the first layer 32 or the second layer 34 is sometimes referred to as delamination.

The in-plane direction separation promoting portion 46 is formed to be broken in a manner that a side portion of the wire-like transmission member 20 in the sheet member 30 is separated in the in-plane direction before the breakage of the covering 24 and the peeling of the wire holding portion 36 and the covering 24 when the peeling force is applied to the wire-like transmission member 20. Here, an intermittent fracture portion 48 is provided as the in-plane direction separation promoting portion 46. As shown in FIG. 1, the intermittent fracture portion 48 is formed by being intermittently broken, along the longitudinal direction of the wire-like transmission member 20 on a side portion of the wire-like transmission member 20 in the sheet member 30. The intermittent fracture portion 48 is a portion formed in what is called a perforated shape. A plurality of short fracture portions 49 are formed at intervals along the longitudinal direction of the wire-like transmission member 20 to form the intermittent fracture portion 48.

At this time, as shown in FIG. 2, the intermittent fracture portion 48 is formed at a depth from the main surface of the sheet member 30 on the wire-like transmission member 20 side to a middle portion in the thickness direction. In this manner, the sheet member 30 can be broken at the thickness direction separation promoting portion 42 in addition to at the in-plane direction separation promoting portion 46. That is, by the formation of the intermittent fracture portion 48 with a depth dimension smaller than the thickness dimension of the sheet member 30 as the in-plane direction separation promoting portion 46, there is a location where stress tends to concentrate in the thickness direction, and separation is performed in the thickness direction at this portion. Therefore, the intermittent fracture portion 48 formed with the depth dimension smaller than the thickness dimension of the sheet member 30 can be regarded as functioning as the thickness direction separation promoting portion 42.

In the example shown in FIG. 1, the intermittent fracture portion 48 is also formed between the wire-like transmission members 20. However, this is not an essential configuration. For example, the intermittent fracture portion 48 is preferably formed on an outer side of the outermost wire-like transmission member 20 in the parallel direction. Further, for example, the intermittent fracture portion 48 is preferably formed at positions sandwiching the wire-like transmission member 20 with the covering 24 having low strength. As the wire-like transmission member 20 with the covering 24 having low strength, for example, the wire-like transmission member 20 with the covering 24 having a small thickness dimension can be considered. In a case where the wire-like transmission member 20 is a general electrical wire, for example, a general electrical wire having a small diameter is considered to be used as a case where the thickness dimension of the covering 24 is small. For example, a general electrical wire having a small diameter is often used for a signal line having a small current value.

The covering breakage suppressing portion 40 is provided at an end portion (end portion in the in-plane direction) of the sheet member 30. Here, the intermittent fracture portion 48 that is not uniform in the in-plane direction is provided at the end portion of the sheet member 30. Note that peeling inside the nonwoven fabric is uniform at any position in the in-plane direction.

It is also conceivable that as the breaking strength of the covering breakage suppressing portion 40 is formed to be weaker than the peeling strength between the wire holding portion 36 and the covering 24 and the breaking strength of the covering 24, the covering breakage suppressing portion 40 is to be broken before the covering 24 is broken and the wire holding portion 36 and the covering 24 are peeled off each other when a peeling force is applied to the wire-like transmission member 20. The breaking strength of the covering breakage suppressing portion 40, the peeling strength between the wire holding portion 36 and the covering 24, and the breaking strength of the covering 24 can be evaluated by, for example, using results of tests performed separately in the same kind of peeling test (for example, each test of JIS K6854). As described above, when the breaking strength of the covering breakage suppressing portion 40 is formed to be weaker than the bonding strength between the wire holding portion 36 and the covering 24 and the mechanical strength of the covering 24, the covering breakage suppressing portion 40 is easily broken before the covering 24 is broken and the wire holding portion 36 and the covering 24 are peeled off, and the breakage of the covering 24 can be suppressed.

At this time, if the peeling strength between the wire holding portion 36 and the covering 24 is formed to be higher than the breaking strength of the covering 24, the breaking of the covering 24 tends to occur before the peeling between the wire holding portion 36 and the covering 24. Even in such a case, since the covering breakage suppressing portion 40 having a higher strength than these is provided, the breakage of the covering 24 can be suppressed.

<Operation>

Figure 3:
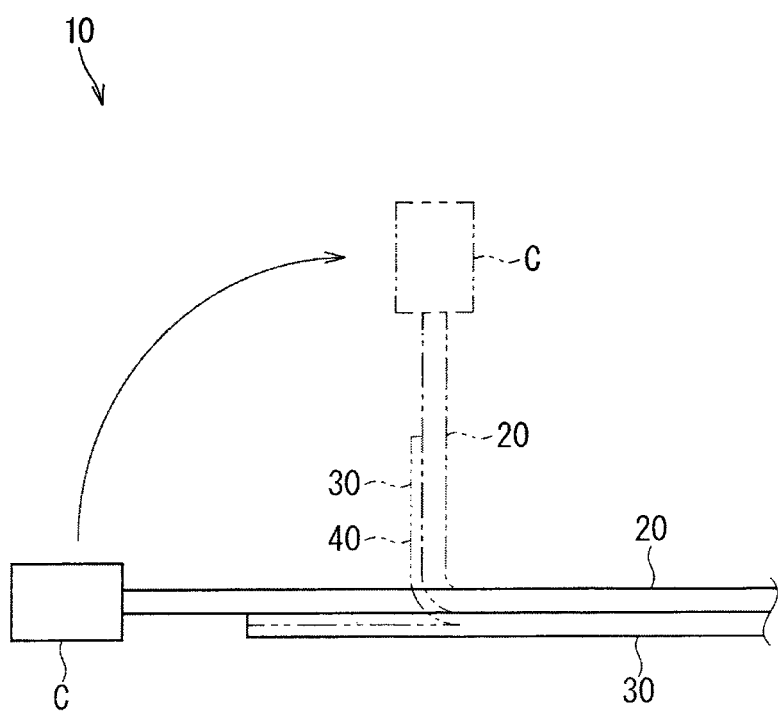
FIG. 3 is a side view for describing the operation when a force for peeling a wire-like transmission member from a sheet member is applied to the wiring member according to the embodiment.
Figure 4:
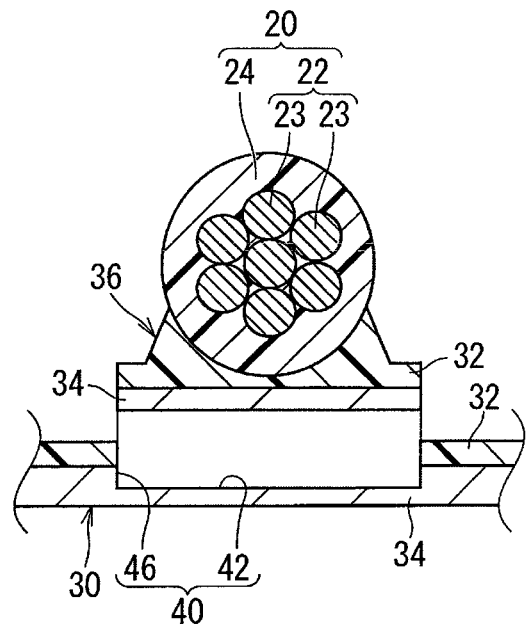
FIG. 4 is a cross-sectional view for describing the operation when a force for peeling the wire-like transmission member from the sheet member is applied to the wiring member according to the embodiment.

The operation of the wiring member 10 when a force for peeling from the sheet member 30 is applied to the wire-like transmission member 20 will be described with reference also to FIGS. 3 and 4. FIGS. 3 and 4 are respectively a side view and a cross-sectional view for describing the operation when a force for peeling the wire-like transmission member 20 from the sheet member 30 is applied to the wiring member 10 according to the embodiment. The operation for applying a force for peeling the wire-like transmission member 20 from the sheet member 30 to the wiring member 10 is not particularly limited, and is the operation that may occur in various states assumed for the wiring member 10, such as when the wiring member 10 is manufactured, and when or after the wiring member 10 is assembled to a vehicle. The example shown in FIG. 3 assumes the operation of moving the connector C in a state where both side portions of the wire-like transmission member in the sheet member 30 are fixed to a vehicle by a fixing component, such as a clamp, or the other main surface of the sheet member 30 is fixed to a vehicle by an adhesive or a double-sided adhesive tape.

As described above, when a force for peeling from the sheet member 30 is applied to the wire-like transmission member 20, the covering breakage suppressing portion 40 is formed to be broken before the peeling of the wire-like transmission member 20 from the sheet member 30 and the breakage of the covering 24. Here, the thickness direction separation promoting portion 42 and the in-plane direction separation promoting portion 46 are broken.

That is, when a peeling force is applied to the wire-like transmission member 20, the plurality of short fracture portions 49 in the intermittent fracture portion 48 are connected to form one long fracture portion, and thus the sheet member 30 is separated in the in-plane direction. At this time, the other main surface side portion of the sheet member 30 where the intermittent fracture portion 48 does not reach along the thickness direction is not separated in the in-plane direction and is kept continuous.

Further, when a peeling force is applied to the wire-like transmission member 20, peeling inside the nonwoven fabric occurs, and the sheet member 30 is separated in the thickness direction. More specifically, the stress concentrates on the bottom portion of the intermittent fracture portion 48 in the thickness direction of the sheet member 30. In this manner, in a portion between the intermittent fracture portions 48 in the in-plane direction of the sheet member 30, peeling inside the nonwoven fabric occurs, and separation occurs in the thickness direction.

As described above, when a force for peeling from the sheet member 30 is applied to the wire-like transmission member 20, the covering breakage suppressing portion 40 is broken before the peeling of the wire-like transmission member 20 from the sheet member 30 and the breakage of the covering 24. In this manner, even in a case where the sheet member 30 and the wire-like transmission member 20 are firmly fixed, the breakage of the covering 24 is suppressed.

Note that the state in which the covering breakage suppressing portion 40 is not broken may be a normal state in which the wiring member 10 is mounted on a vehicle. In this case, for example, breakage of the covering breakage suppressing portion 40 may occur instead of breakage of the covering 24 by irregular work that is not normally performed during mounting operation or irregular operation after mounting on a vehicle. Further, the state in which the covering breakage suppressing portion 40 is broken may be the normal state in which the wiring member 10 is mounted on a vehicle. In this case, for example, breakage of the covering breakage suppressing portion 40 may occur instead of breakage of the covering 24 by work normally performed as mounting work. Further, in this case, there may remain room for the covering breakage suppressing portion 40 to break in the normal state where the wiring member 10 is mounted on a vehicle.

According to the wiring member 10 configured as described above, the covering breakage suppressing portion 40 is formed to be broken before the covering 24 is broken and the wire holding portion 36 and the covering 24 are peeled off, and breakage of the covering 24 can be suppressed.

Further, since the covering breakage suppressing portion 40 is formed so as to be broken in such a manner that the sheet member 30 is separated in the thickness direction, part of the sheet member 30 can be kept continuous in the in-plane direction.

Further, the covering breakage suppressing portion 40 is formed so as to be broken in such a manner that the side portion of the wire-like transmission member 20 in the sheet member 30 is separated in the in-plane direction. For this reason, a portion of the covering breakage suppressing portion 40 in the in-plane direction can be separated in the thickness direction in case of being used together with the thickness direction separation promoting portion 42.

Further, since the intermittent fracture portion 48 in which the sheet member 30 is intermittently broken is formed in the side portion of the wire-like transmission member 20 in the sheet member 30 along the longitudinal direction of the wire-like transmission member 20, the side portion of the wire-like transmission member 20 in the sheet member 30 is easily broken by the intermittent fracture portion 48.

Further, since the intermittent fracture portion 48 is formed with a depth from the main surface on the wire-like transmission member 20 side to the middle portion in the thickness direction in the sheet member 30, the sheet member 30 can also be broken in the thickness direction.

Further, since the covering breakage suppressing portion 40 is formed so as to be broken by peeling inside the nonwoven fabric, the covering breakage suppressing portion 40 can be easily formed by the nonwoven fabric.

Further, since the sheet member 30 further includes the first layer 32 that is laminated on the second layer 34 formed of the nonwoven fabric and directly fixed to the wire-like transmission member 20, a layer of the nonwoven fabric can be provided as the second layer 34 that is different from the first layer 32 directly fixed to the wire-like transmission member 20.

The force for peeling the wire-like transmission member 20 is likely to be applied to the end portion of the sheet member 30. More specifically, at the middle portion in the in-plane direction of the sheet member 30, it is easy to make the peeling force less likely to reach the wire-like transmission member 20 by separately providing a cover or the like. In contrast, at an end portion in the in-plane direction of the sheet member 30, the peeling force is likely to reach the wire-like transmission member 20 even if a cover or the like is separately provided. Even in such a case, since the covering breakage suppressing portion 40 is provided at the end portion of the sheet member 30, the breakage of the covering 24 can be suppressed at the end portion of the sheet member 30.

{Variation}

Figure 5:
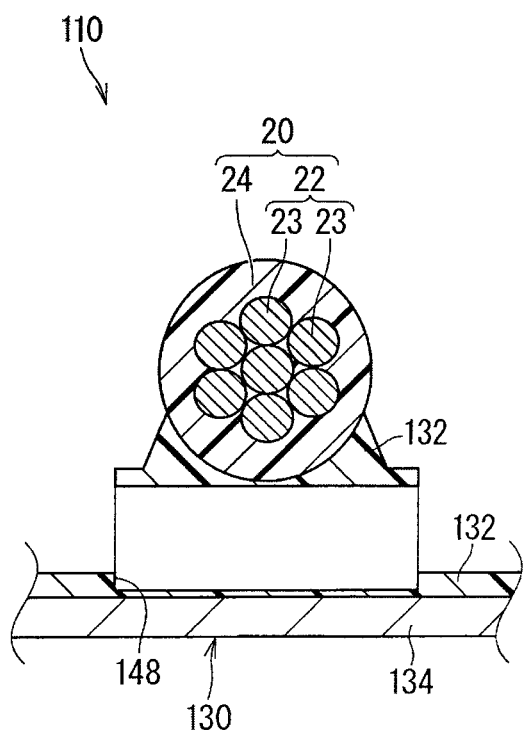
FIG. 5 is a cross-sectional view for describing the operation when a force for peeling a wire-like transmission member from a sheet member is applied to a wiring member according to a first variation.

FIG. 5 is a cross-sectional view for describing the operation when a force for peeling the wire-like transmission member 20 from a sheet member 130 is applied to a wiring member 110 according to a first variation.

The wiring member 110 according to the first variation is an example that is formed such that separation occurs in the thickness direction in a first layer 132. For example, since a depth dimension of an intermittent fracture portion 148 is set to a value smaller than a thickness dimension of the first layer 132, stress concentration is likely to occur in the first layer 132, so that separation occurs in the thickness direction in the first layer 132. Further, in a case where a shape in which stress concentration is likely to occur is not given, for example, the peeling strength of the first layer 132 is made lower than the bonding strength between the first layer 132 and a second layer 134 and the peeling strength of the second layer 134, so that separation occurs in the thickness direction between the first layer 132 and the second layer 134.

Figure 6:
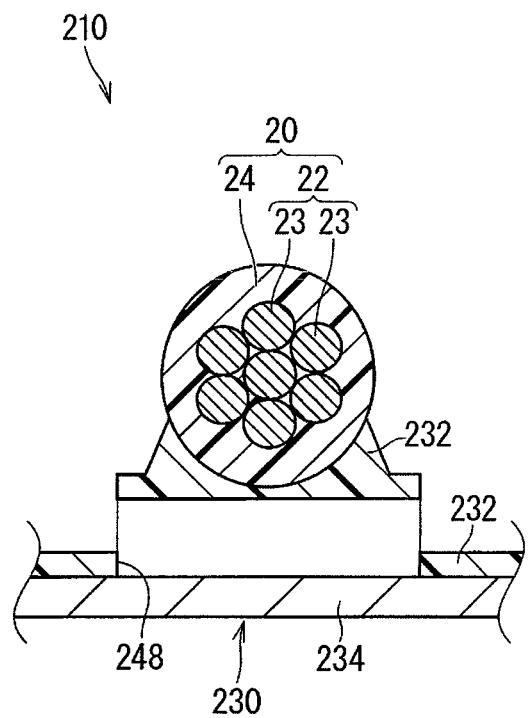
FIG. 6 is a cross-sectional view for describing the operation when a force for peeling a wire-like transmission member from a sheet member is applied to a wiring member according to a second variation.

FIG. 6 is a cross-sectional view for describing the operation when a force for peeling the wire-like transmission member 20 from a sheet member 230 is applied to a wiring member 210 according to a second variation.

The wiring member 210 according to the second variation is an example that is formed such that separation occurs in the thickness direction between a first layer 232 and a second layer 234. For example, since a depth dimension of an intermittent fracture portion 248 is set to the same value as a thickness dimension of the first layer 232, stress concentration is likely to occur between the first layer 232 and the second layer 234, so that separation occurs in the thickness direction between the first layer 232 and the second layer 234. Further, in a case where a shape in which stress concentration is likely to occur is not given, for example, the bonding strength between the first layer 232 and the second layer 234 is made lower than the peeling strength of the first layer 232 and the peeling strength of the second layer 234, so that separation occurs in the thickness direction between the first layer 232 and the second layer 234.

Figure 7:
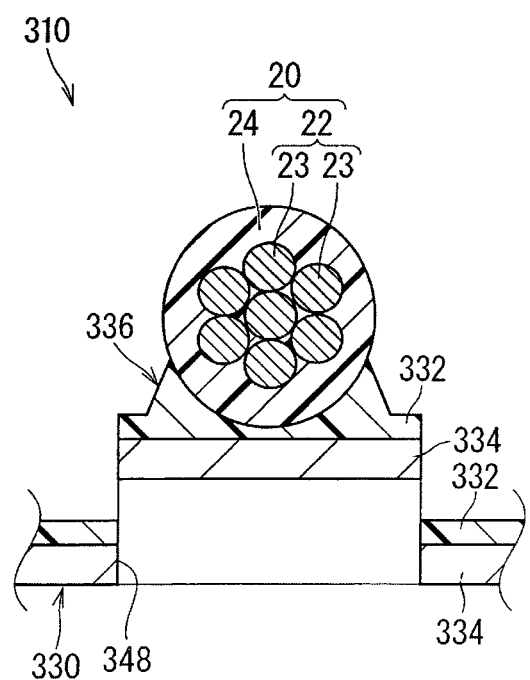
FIG. 7 is a cross-sectional view for describing the operation when a force for peeling a wire-like transmission member from a sheet member is applied to a wiring member according to a third variation.
Figure 8:
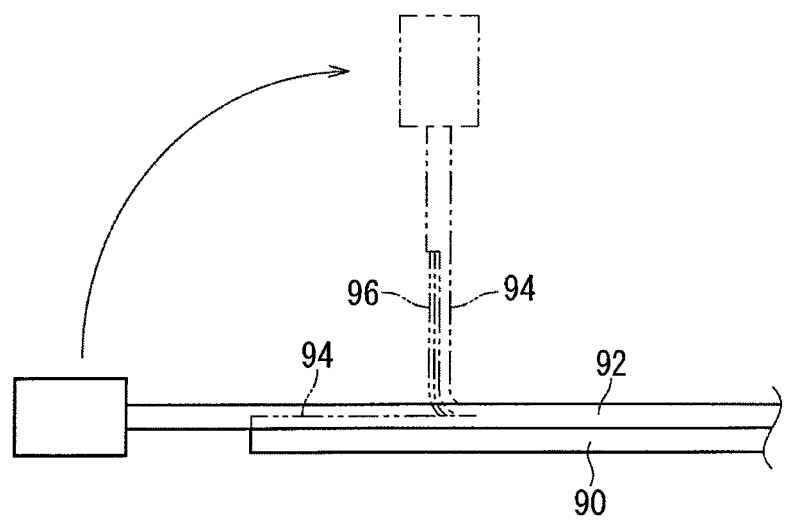
FIG. 8 is a side view for describing a state where a covering breaks in a conventional example.

FIG. 7 is a cross-sectional view for describing the operation when a force for peeling the wire-like transmission member 20 from a sheet member 330 is applied to a wiring member 310 according to a third variation.

The wiring member 310 according to the third variation is an example in which the thickness direction separation promoting portion 42 is not provided. For example, a state in which the thickness direction separation promoting portion 42 is not provided can be established by, for example, setting a depth dimension of an intermittent fracture portion 348 to the same value as a thickness dimension of the sheet member 330. In this case, the entire portion in the thickness direction between the intermittent fracture portions 348 of the sheet member 330 is separated in the in-plane direction. In a case where the thickness direction separation promoting portion 42 is not provided and an in-plane direction separation portion is provided, reduction in the thickness of a wire holding portion 336 can be suppressed even after the separation.

In addition, although the sheet member 30 has been described as being provided with the in-plane direction separation promoting portion 46, this is not an essential configuration. There may be a case where the in-plane direction separation promoting portion 46 is not provided in the sheet member 30. For example, a case where the intermittent fracture portion 48 is not provided in the sheet member 30 in the embodiment is conceivable. In this case, a portion of the sheet member that is separated in the thickness direction spreads over the entire in-plane direction. Note that, even in this case, normally, the force for peeling the wire-like transmission member 20 from the sheet member is applied to a portion in the in-plane direction, and separation of the entire sheet member in the thickness direction is suppressed.

Further, although the intermittent fracture portion 48 has been described as being provided as the in-plane direction separation promoting portion 46, this is not an essential configuration. As the in-plane direction separation promoting portion 46, for example, another structure in which stress is likely to be concentrated may be formed, such as a groove recessed in the thickness direction and a cut in an edge portion.

Further, although the force for peeling the wire-like transmission member 20 has been described to be applied to a portion located at an end portion of the sheet member 30, this is not an essential configuration. For example, there may be a case where there is a portion where the covering 24 and the sheet member 30 are not directly fixed in the middle portion of the sheet member 30, and, for example, due to the wire-like transmission member 20 of the portion being caught on a peripheral member, the force for peeling the wire-like transmission member 20 is applied to a portion located in the middle portion of the sheet member 30. Accordingly, the covering breakage suppressing portion 40 that is not uniform in the in-plane direction, such as the intermittent fracture portion 48, may be provided at such a location.

Note that, the configurations described in the above embodiments and variations can be combined as appropriate unless the configurations contradict each other.

Although the present invention is described above in detail, the above description is exemplary in all the aspects, and the present invention is not limited to this. It is understood that countless variations that are not exemplified are conceivable without departing from the scope of the present invention.

EXPLANATION OF REFERENCE SIGNS

10: wiring member
20: wire-like transmission member
22: transmission line main body
24: covering
30: sheet member
32: first layer
34: second layer (nonwoven fabric layer)
36: wire holding portion
40: covering breakage suppressing portion
42: thickness direction separation promoting portion
46: in-plane direction separation promoting portion
48: intermittent fracture portion

The invention claimed is:

1. A wiring member comprising:
a wire-like transmission member including a transmission line main body and a covering that covers the transmission line main body; and
a sheet member including a wire holding portion that is directly fixed to the covering of the wire-like transmission member disposed on a main surface and holds the wire-like transmission member, and a covering breakage suppressing portion that is provided around the wire holding portion and is broken before breakage of the covering and peeling between the wire holding portion and the covering when a force for peeling is applied to the wire-like transmission member, wherein
the covering breakage suppressing portion is formed such that the sheet member is broken in a manner of separating in a thickness direction.

2. The wiring member according to claim 1, wherein the covering breakage suppressing portion is provided at an end portion of the sheet member.

3. A wiring member comprising:
a wire-like transmission member including a transmission line main body and a covering that covers the transmission line main body; and
a sheet member including a wire holding portion that is directly fixed to the covering of the wire-like transmission member disposed on a main surface and holds the wire-like transmission member, and a covering breakage suppressing portion that is provided around the wire holding portion and is broken before breakage of the covering and peeling between the wire holding portion and the covering when a force for peeling is applied to the wire-like transmission member, wherein
the covering breakage suppressing portion is formed such that a side portion of the wire-like transmission member in the sheet member is broken in a manner of separating in an in-plane direction.

4. The wiring member according to claim 3, wherein
an intermittent fracture portion where the sheet member is intermittently broken is formed in the side portion of the wire-like transmission member in the sheet member along a longitudinal direction of the wire-like transmission member.

5. The wiring member according to claim 4, wherein
the intermittent fracture portion is formed with a depth from a main surface on a side of the wire-like transmission member to a middle portion in the thickness direction in the sheet member.

6. A wiring member comprising:
a wire-like transmission member including a transmission line main body and a covering that covers the transmission line main body; and
a sheet member including a wire holding portion that is directly fixed to the covering of the wire-like transmission member disposed on a main surface and holds the wire-like transmission member, and a covering breakage suppressing portion that is provided around the wire holding portion and is broken before breakage of the covering and peeling between the wire holding portion and the covering when a force for peeling is applied to the wire-like transmission member,
wherein
the sheet member includes a layer formed of nonwoven fabric, and
the covering breakage suppressing portion is formed to be broken by peeling inside the nonwoven fabric.

7. The wiring member according to claim 6, wherein
the sheet member further includes a layer laminated on the layer formed of the nonwoven fabric and directly fixed to the wire-like transmission member.

* * * * *